United States Patent [19]

Hill et al.

[11] Patent Number: 4,980,389

[45] Date of Patent: Dec. 25, 1990

[54] POLYETHERIMIDE FOAM PRECURSORS AND FOAMS HAVING IMPROVED PHYSICAL PROPERTIES AND METHODS OF MAKING THEM

[75] Inventors: Francis U. Hill, San Diego, Calif.; Paul F. Schoenzart, Leverkusen, Fed. Rep. of Germany; Werner P. Frank, Gladbach, Fed. Rep. of Germany

[73] Assignee: Irbit Research & Consulting AG, Fribourg, Switzerland

[21] Appl. No.: 503,675

[22] Filed: Apr. 3, 1990

[51] Int. Cl.$^5$ .................... C08G 63/44; C08G 69/44; C08G 73/10

[52] U.S. Cl. .................... 521/185; 521/182; 521/183; 525/179; 525/183; 525/188; 525/351; 525/353

[58] Field of Search .................... 521/185, 182, 183; 528/351, 353, 179, 183, 188

[56] References Cited

U.S. PATENT DOCUMENTS

| | | | |
|---|---|---|---|
| 3,554,939 | 1/1971 | Lavin et al. | 521/114 |
| 4,394,464 | 7/1983 | Gagliani et al. | 521/180 |
| 4,407,980 | 10/1983 | Gagliani et al. | 521/180 |
| 4,476,254 | 9/1984 | Long et al. | 521/180 |

Primary Examiner—Morton Foelak
Attorney, Agent, or Firm—Bacon and Thomas

[57] ABSTRACT

A method of making polyetherimide foam precursors and flexible polyetherimide foams having improved specific tensile strength, resistance to high temperatures and flame, low density and flexibility at both high and cryogenic temperatures. 4,4'-oxydiphthalic anhydride (ODPA) is reacted with an alcohol to produce a diester, which is then reacted with a suitable monomeric polyamine such as meta phenylene diamine to produce a precursor. This material is dried to a solid block or powder. Upon heating, foaming occurs, resulting in a fine celled white friable mass. The foam is cured by heating for a suitable period and is ready for use.

12 Claims, No Drawings

POLYETHERIMIDE FOAM PRECURSORS AND FOAMS HAVING IMPROVED PHYSICAL PROPERTIES AND METHODS OF MAKING THEM

BACKGROUND OF THE INVENTION

This invention relates in general to methods of producing polyimide foam products and, more specifically, to the production of a foam having improved physical characteristics.

A number of methods of manufacturing polyimide foam products have been developed, such as those described by Lavin in U.S. Pat. No. 3,554,939, by Gagliani et al in U.S. Pat. Nos. 4,394,464 and 4,407,980 and by Long et al in U.S. Pat. No. 4,476,254.

Lavin et al in U.S. Pat. No. 3,483,144 describes a process for preparation of a polyimide foam which is the reaction product of a tetracarboxylic acid or tetracarboxylic acid dianhydride and a polyamine containing from 2 to 6 amino groups per molecule. The preferred tetracarboxylic acid is 3,3',4,4'-benzophenone tetracarboxylic acid. A polyimide foam on the basis of 4,4'-oxydiphthalic acid or anhydride is not disclosed.

Other prior methods of making polyimide foam such as disclosed in U.S. Pat. No. 3,554,939 generally combined a single monomeric polycarboxylic acid ester component, such as 3,3', 4,4' benzophenone tetracarboxylic acid dianhydride (BTDA) converted to the half-ester, with one or more monomeric polyamine components. Others reflux a dianhydride such as BTDA with an oxoimine or lactame such as caprolactam, until esterification is complete, then add the diamine or diamines. The resulting precursor is dried and can be caused to spontaneously foam by heating to an appropriate temperature.

While these prior techniques often produce foam products having excellent characteristics for particular purposes, we have found they do not have the specific tensile strength and flexibility and low density desired for many applications. Thus, there is a continuing need for improved polyimide foams and methods of making them.

It is a further object of this invention to provide a process for the preparation of polyimide foams having improved flexibility, low density and specific tensile strength.

It is a further object of this invention to provide such polyimide foams.

SUMMARY OF THE INVENTION

In order to prepare a foam having improved flexibility, specific tensile strength and low density, in addition to other improved physical properties, a foamable precursor is initially prepared. 4,4'-oxydiphthalic anhydride (ODPA) is reacted with an alcohol to the corresponding half ester. The reaction is carried out in a suitable solvent. Preferably the alcohol is used as a solvent. Typical solvents include aliphatic alcohols having 1 to 7 carbon atoms and aromatic alcohols. Best results have been obtained with lower alcohols, such as methyl or ethyl alcohol. Any suitable quantity of solvent or mixtures thereof may be used. Typically, a slight excess beyond the quantity required to dissolve the material being dissolved produces best results.

The reaction is carried out at elevated temperatures. Preferably the solution of ODPA is refluxed for a period sufficient to convert the material to the diester form (preferably from about 120 to 240 minutes).

A suitable polyamine is then added to the diester solution to form the polyimide precursor. The polyamine is dissolved in the same (or a compatible) solvent. Additives such as surfactants, fillers, hardeners, reinforcing materials, ultraviolet absorbers or the like may be added, if desired.

The reaction with the polyamine is carried out at a temperature ranging from ambient temperatures to about 50° C., preferably at ambient temperature.

The solvent may be removed to thicken or dry the precursor. Typically, spray drying, vacuum drying or heating at a temperature of from about 50° to 90° C. may be used. For ease of handling and foaming, drying to a fine powder is preferred.

The precursor may be caused to foam by heating in any suitable manner, such as microwave heating, thermal heating such as in an oven, or any combination thereof. Where a thick liquid precursor is used, the foam cell size tends to be larger and a lower density foam results, apparently due to the evaporation of the volatile solvent. With a dry powder precursor, the material initially melts, then spontaneously foams, producing a higher density foam of smaller and more uniform cell size. In either case, a primarily closed cell foam results.

Curing of the foamed resin is preferably accomplished in a thermal oven after foaming is complete, generally at a temperature of from about 250° to 380° C. for from about 30 to 90 minutes. Preferably, curing is begun at a lower temperature, typically 220° C. and is gradually raised to a higher temperature as cure progresses. Once the cure is complete, the foam may be post heated to temperatures as high as 350° C. for 24 hours or more without significantly degrading the properties of the foam.

Any suitable polyamine may be used. Typical polyamines include diamines such as para- and meta-phenylene diamine, methylene dianilin, oxy dianiline, biphenyle diamines, toluene diamines and mixtures thereof.

Other polyamines which contain from 3 to 6 amine groups per molecule may also be used. Examples of such suitable polyamines include melamine, 1,2,4-benzenetriamine; 1,3,5-triaminobenzene; 2,4,4'-bis-phenyltriamine and others.

The preferred polyamines for use in this invention are the diamines. Best results have been obtained with metaphenylene diamine, methylene dianiline and mixtures thereof.

Additives to modify or enhance desired physical characteristics of the final foam may be added at appropriate points during the process. Typical additives include fillers, finely divided reinforcing material, surfactants to improve uniformity of cell structure, ultraviolet absorbers, hardeners and the like. Typical surfactants include Dow Chemical Corp. DC 190 and 193 silicone surfactants, Minnesota Mining & Manufacturing Co. FC430 and Union Carbide Corp. L550. Typical fillers and reinforcements include Kevlar aramid fibers, glass fibers, graphite fibers, Teflon fluorocarbon powders and mixtures thereof.

DETAILED DESCRIPTION OF PREFERRED EMBODIMENTS

Details of the invention and of preferred embodiments thereof will be further understood upon reference to the following examples. Parts and percentages are by weight unless otherwise indicated.

EXAMPLE I

About one mole (310.2 g) of 4,4′ oxydiphthalic anhydride (ODPA) is dissolved in about 565 ml. methyl alcohol. The solution is refluxed for about 2 hours, then allowed to cool to about 50° C. About one mole (108,1 g.) of meta phenylen diamine, is dissolved in about 200 ml. of methyl alcohol and the resulting solution is slowly added to the ODPA solution. The solution is stirred for about 30 minutes, then about 4 g of Dow Chemical DC 193 surfactant is added, with further stirring for about 5 minutes. The resulting solution contains the precursor for the foamable resin of this invention.

EXAMPLE II

This example demonstrates the production of solid precursor materials. The solution produced in Example I is dried to a block or powder. One-half of the solution is placed in a flask and partially dried in a laboratory heated rotary evaporator using a vacuum pump to about half the original volume. Upon cooling to room temperature the solution hardens into a solid block. The second half of the precursor solution is dried in the heated evaporator under vacuum until thoroughly dried. A fine gray powder results. These solid precursor materials are suitable for thermal foaming.

EXAMPLE III

This example demonstrates the production of polyimide foam through the condensation stage. Half of each of the solid and powdered precursors produced in Example II are placed in a thermal oven at about 190° C. Both samples almost immediately begin to foam, each forming a fine white friable mass. The second pair of solid and powdered precursors produced in Example II are placed in a Varian industrial microwave oven, which is the operated at full power (3 KW) for about 10 minutes. The samples foam, producing fine white friable masses. In each case a thin external skin having a thickness of about 1 mm is formed on the mass. The foam masses are self-supporting but have low strength.

EXAMPLE IV

Thermal curing (cross-linking) of the foamed samples is demonstrated by this example. The samples produced in Example III are placed in a thermal oven which had been preheated to about 190° C. The temperature of the oven is increased at a rate of about 15° C. per hour for a period of about 6 hours. At the end of this heating cycle, the cured foam products are removed from the oven. Upon slicing all of the samples, it is seen that those formed from the finely divided powder have smaller cells, greater cell size uniformity and greater density than those foamed from solid precursor blocks. The foam products have closed cells and, when compressed and released, show a high degree of restitution, with very little damage to cell walls. Samples of the foam produced from the powdered precursor show particularly outstanding characteristics. The tensile strength is found to be about 105 kPa. When compressed to about ¼ of the original thickness, the foam returns to the original height with no measurable permanent set. Density is found to be about 5 kg/m$^3$. The strength to density ratio, defined as specific tensile strength, is calculated to be about four times higher than with polyimide foams of the prior art. Small foam samples, after having been heated in a thermal oven at about 300° C. for several hours and having been immersed in liquid nitrogen, then returned to room temperature show no.

EXAMPLE V

Three samples of foamable resin precursor are prepared as described in Example I, with the following changes: Example V(a) One mole of methylene diamiline, preferably 4,4′ methylene dianiline, is substituted for the meta phenylene diamine; Example V(b) One mole of 4,4′-diamino diphenyl sulfone ist substituted for the meta phenylene diamine; Example V(c) a mixture of one-half mole meta phenylene diamine and one-half mole methylene dianiline, preferably 4,4′ methylene diamiline, in place of the one mole meta phenylene diamine and Example V(d) one mole of 3,3′, 4,4′-benzophenone tetracarboxylic dianhydride (BTDA) is used in place of the one mole of 4,4′-oxydiphthalic anhydride (ODPA).

Each of these precursors is processed as described in Examples II–IV, then tested as described in Example IV. Every formulation using ODPA has superior physical properties then compared to the sample using BTDA. Best overall results were obtained with the sample of Example I.

The characteristics of the products made of the precursor of example I or of the example IV and V(d) are shown below.

|  | Example IV | Example V(d) |
| --- | --- | --- |
| density | 5 ± 1.5 kg/m$^3$ | 8 ± 1.5 kg/m$^3$ |
| tensile strength | 95 ± 10 kPa | 50 ± 10 kPa |
| temperature resistance |  |  |
| long time | 300° C. | 260° C. |
| short time | 350° C. | 300° C. |
| inflammability | no visible inflammation minimal smoke development | short-time inflammation significant smoke and soot development |

The above data clearly show that the polyimide foams according to the present invention are surprisingly superior over that of the prior art.

EXAMPLE VI

Two samples are prepared as described in Example I, then dried to a powder as described in Example II. In one sample, however, BTDA is substituted for ODPA on an equi-molar basis. Portions of the two powders (ODPA and BTDA-based) are mixed together on a weight per cent basis as follows: Example VI(a) 100% BTDA, Example VI(b) 75% BTDA, 25% ODPA, Example VI(c) 50% BTDA, 50% ODPA, Example VI(d) 25% BTDA, 75% ODPA, and Example VI(e) 100% ODPA. The samples are processed as described in Examples III and IV, then tested as described in Example IV. Resiliency and tensile strength are found to improve in direct proportion to the proportion of ODPA-based powder in the mixture.

EXAMPLE VII

The method described in Examples I-IV is repeated with the following changes: Example VII(a) no surfactant or other additive is used, Example VII(b) about 10 wt % finely chopped glass fibers is added to the resin precursor prior to drying, Example VII(c) the surfactant is replaced with about 5 g. Union Carbide L550 surfactant, Example VII(d) the methyl alcohol is replaced with an approximately equal weight of isopropyl alcohol. In each case a good, resilient foam having high tensile strength is produced. The sample of Example jVII(a), with no surfactant shows irregular cell size and relatively larger cells. Best results, however, are obtained with the method and ingredients as described in Examples I–IV.

While certain preferred materials, conditions and proportions were described in the above description of preferred embodiments, those may be modified or replaced, where suitable, with similar results. Other variations, modifications and applications of this invention will occur to those skilled in the art upon reading this disclosure and are included within the scope of this invention, as defined in the appended claims.

We claim:

1. The method of making a polyimide foam precursor which comprises the steps of:
   converting 4,4'-oxydiphthalic anhydride and corresponding isomers by reaction with a $C_1$–$C_7$-alcohol in a suitable solvent to the corresponding ester derivatives of 4,4'-oxydiphthalic acid and corresponding isomers;
   reacting said ester derivatives with a polyamine in a suitable solvent at a temperature ranging from about ambient temperature to about 50° C.; and
   removing the solvent at least partially to obtain the polyimide foam precursor.

2. The method according to claim 1 wherein said $C_1$–$C_7$-alcohol and mixtures thereof are used as a solvent.

3. The method according to claim 2 wherein the reaction is carried out at reflux temperatures until reaction is complete.

4. The method according to claim 1 wherein said polyamine is a diamine.

5. The method according to claim 4 wherein substantially equimolar quantities of 4,4'-oxydiphthalic anhydride and corresponding isomers and diamine are used.

6. The method according to claim 1 wherein said polyamine is selected from the group consisting of p- and m-phenylene diamines, methylene dianilines, oxydianilines, biphenyle diamines, toluene diamine and mixtures thereof.

7. The method according to claim 1 including the further step of adding to the solution of said precursor in said solvent a suitable quantity of an additive selected from the group consisting of surfactants, fillers, finely divided reinforcing materials, ultraviolet absorbers, hardeners and mixtures thereof.

8. The method according to claim 1 wherein said precursor is dried to a thick liquid, then cooled to room temperature, whereupon a solid mass is produced.

9. The method according to claim 1 wherein said precursor is dried to a finally divided powder.

10. A polyimide foam precursor obtained according to claim 1.

11. The method of making a resilient, high specific tensile strength, low density, cured, white coloured polyimide foam product which comprises the steps of:
    heating the polyimide foam precursor according to claim 10 to a temperature sufficient to cause spontaneous foaming; and
    heating the resulting foam to a temperature of from about 250° to 300° C. for a period sufficient to substantially fully cure the polyimide.

12. The polyimide foam product obtained according to claim 11.

* * * * *